(12) United States Patent
Van Elmpt et al.

(10) Patent No.: US 12,137,649 B2
(45) Date of Patent: Nov. 12, 2024

(54) GREENHOUSE LUMINAIRE WITH MINIMAL DAYLIGHT INTERCEPTION

(71) Applicant: SIGNIFY HOLDING B.V., Eindhoven (NL)

(72) Inventors: Rob Franciscus Maria Van Elmpt, Roermond (NL); Marcellinus Petrus Carolus Michael Krijn, Eindhoven (NL); Bartel Marinus Van De Sluis, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/916,533

(22) PCT Filed: Mar. 26, 2021

(86) PCT No.: PCT/EP2021/058030
§ 371 (c)(1),
(2) Date: Sep. 30, 2022

(87) PCT Pub. No.: WO2021/198110
PCT Pub. Date: Oct. 7, 2021

(65) Prior Publication Data
US 2023/0148488 A1  May 18, 2023

(30) Foreign Application Priority Data

Apr. 3, 2020  (EP) .................................... 20168013

(51) Int. Cl.
*A01G 9/24*  (2006.01)
*F21S 2/00*  (2016.01)
(Continued)

(52) U.S. Cl.
CPC .............. *A01G 9/249* (2019.05); *F21S 2/005* (2013.01); *F21S 8/06* (2013.01); *F21V 7/0066* (2013.01);
(Continued)

(58) Field of Classification Search
CPC .. A01G 9/249; F21S 2/005; F21S 8/06; F21S 4/28; F21V 7/0066; F21V 15/01;
(Continued)

(56) References Cited

U.S. PATENT DOCUMENTS 4,703,404 A * 10/1987 Helton, III .............. F21V 29/76
362/427
4,800,475 A     1/1989 Panagiotou
(Continued)

FOREIGN PATENT DOCUMENTS

CN      201003711 Y     1/2008
CN      107461683 A     12/2017
(Continued)

*Primary Examiner* — Tsion Tumebo

(57) ABSTRACT

A light generating device (100) comprising a plurality of solid state light sources (10) and a housing (120) comprising side wall elements (20). The light sources (10) are enclosed by the side wall elements (20), and the light generating device (100) generates >=90% of light source light (11) within a triangular prism having a top angle ($\alpha$)<=180°. The side wall elements (20): —each have a first side (21) directed inwards facing the light sources (10) and a second side (22) which is directed outwards and is reflective for visible light;—are configured at both sides of a housing plane (110), under an angle ($\beta1$) between 0-45° relative to the housing plane (110);—have a projection with height H1 on the housing plane (110)—define a largest width (W1) of the light housing 120), wherein H1/W1>1.

15 Claims, 6 Drawing Sheets

(51) Int. Cl.
  *F21S 8/06* (2006.01)
  *F21V 7/00* (2006.01)
  *F21V 15/01* (2006.01)
  *F21V 29/503* (2015.01)
  *F21V 29/507* (2015.01)
  *F21V 29/76* (2015.01)
  *F21V 31/03* (2006.01)
  *F21Y 115/10* (2016.01)

(52) U.S. Cl.
  CPC ............ *F21V 15/01* (2013.01); *F21V 29/503* (2015.01); *F21V 29/767* (2015.01); *F21V 29/507* (2015.01); *F21V 31/03* (2013.01); *F21Y 2115/10* (2016.08)

(58) Field of Classification Search
  CPC .... F21V 29/503; F21V 29/767; F21V 29/507; F21V 31/03; F21V 7/05; F21V 7/22; F21V 21/112; F21V 29/83; F21Y 2115/10; F21Y 2103/10; F21W 2131/40
  See application file for complete search history.

(56) References Cited

U.S. PATENT DOCUMENTS

| | | | |
|---|---|---|---|
| 5,375,354 A * | 12/1994 | Rutledge | G09F 21/04 40/591 |
| 7,033,060 B2 | 4/2006 | Dubuc | |
| 8,888,314 B2 * | 11/2014 | Gill | F21S 4/28 362/240 |
| 9,074,756 B2 * | 7/2015 | McLean | G09F 13/18 |
| 9,512,978 B1 * | 12/2016 | Wimberly | F21V 7/041 |
| 10,276,073 B2 * | 4/2019 | Qi | B29C 45/006 |
| 10,314,243 B2 * | 6/2019 | Speer | G02B 6/0005 |
| 10,624,275 B1 * | 4/2020 | Lewis | A01G 9/247 |
| 2010/0053966 A1 | 3/2010 | Tu et al. | |
| 2013/0148354 A1 | 6/2013 | McGehee et al. | |
| 2014/0104859 A1 | 4/2014 | Araman | |
| 2017/0030566 A1 | 2/2017 | Milam | |
| 2017/0198899 A1 * | 7/2017 | Lockart | F21V 29/508 |
| 2018/0352755 A1 | 12/2018 | Szoradi et al. | |
| 2019/0113219 A1 * | 4/2019 | Niemiec | A01M 1/08 |
| 2019/0323681 A1 | 10/2019 | Adamson et al. | |

FOREIGN PATENT DOCUMENTS

| | | |
|---|---|---|
| CN | 209116153 U | 7/2019 |
| EP | 3324099 A1 | 5/2018 |
| JP | 2007323877 A | 12/2007 |
| WO | 2010058956 A2 | 5/2010 |
| WO | 2015150963 A1 | 10/2015 |
| WO | 2018203252 A1 | 11/2018 |

* cited by examiner

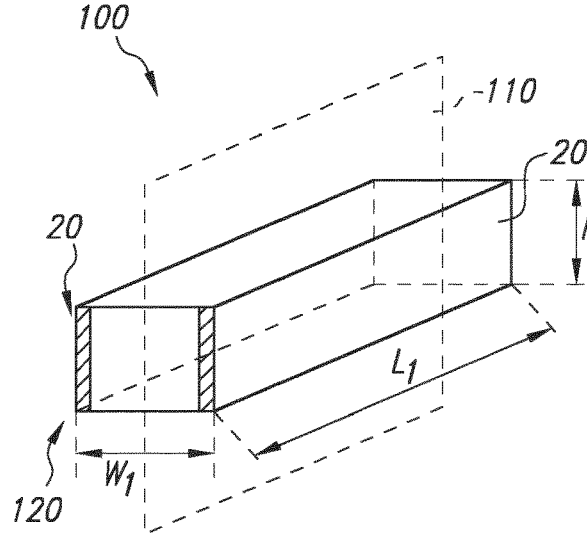
FIG. 1A
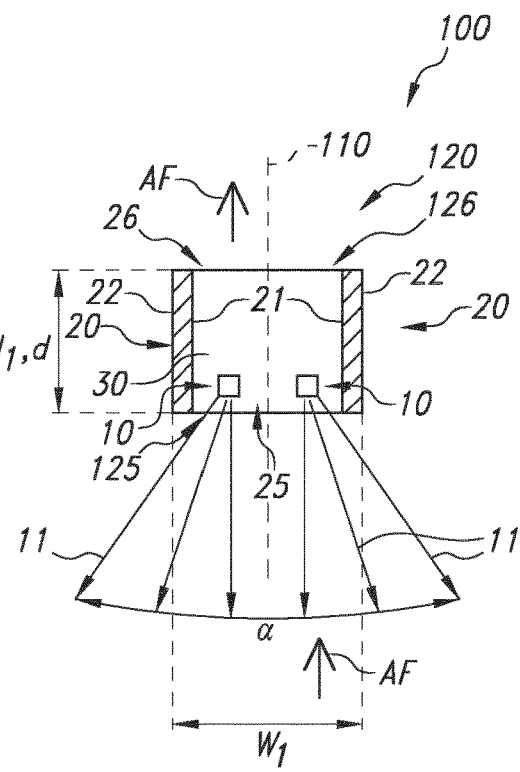
FIG. 1B-I
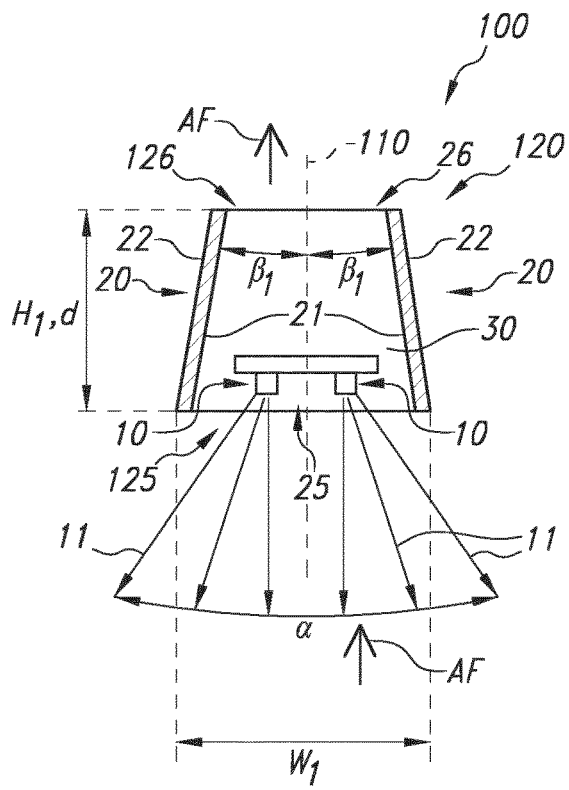
FIG. 1B-II
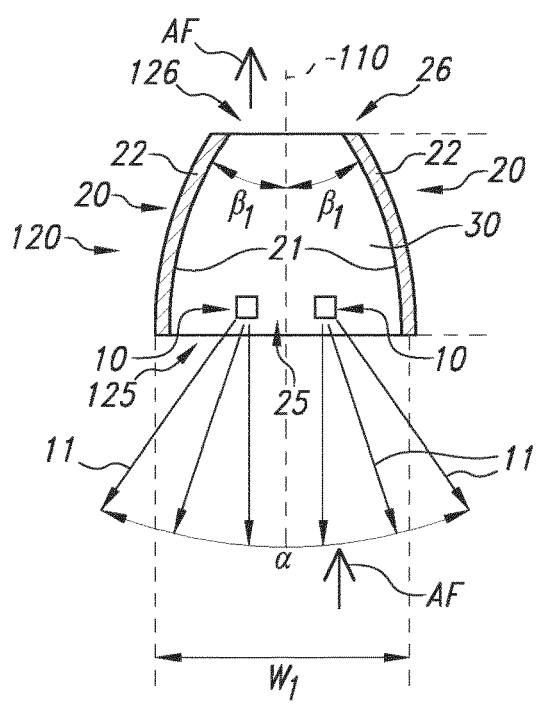
FIG. 1B-III

GREENHOUSE LUMINAIRE WITH MINIMAL DAYLIGHT INTERCEPTION

CROSS-REFERENCE TO PRIOR APPLICATIONS

This application is the U.S. National Phase application under 35 U.S.C. § 371 of International Application No. PCT/EP2021/058030, filed on Mar. 26, 2021, which claims the benefit of European Patent Application No. 20168013.9, filed on Apr. 3, 2020. These applications are hereby incorporated by reference herein.

FIELD OF THE INVENTION

The invention relates to a light generating device, amongst others for e.g. greenhouse lighting, to an agricultural facility comprising such light generating device, and also to a method of installing such light generating device.

BACKGROUND OF THE INVENTION

Methods and apparatus for irradiation of plants using light emitting diodes are known in the art. U.S. Pat. No. 7,033,060B2, for instance, describes a greenhouse lamp comprising at least one PCB, at least one LED mounted on said at least one PCB; a carrier having a heat sink, said at least one PCB attached to said carrier; a shim, said shim securing the PCB to said carrier; a clamp adapted for mounting said lamp; and a power supply. The clamp is adapted for mounting said lamp to a greenhouse frame. The carrier is about 4.5 cm wide and about 240 cm long and the PCB is about 3 cm wide and about 60 cm long. The greenhouse further comprises a plurality PCBs each having at least one LED, wherein the PCBs are attached to the carrier. The carrier comprises a base with a channel for receiving the PCB. The PCB is a metal core PCB strip and a plurality of power package LEDs are mounted on the PCB strip. The shim is a collar surrounding one LED. The greenhouse lamp further comprises a heat sink.

SUMMARY OF THE INVENTION

For greenhouse lighting systems it appears important to minimize blocking of daylight to maximize light level and production inside the greenhouse. In a typical situation where about 200 umol/s/m$^2$ of artificial light is installed with often used HID/SON-t 1000W fixtures, the interception appears to be about 2-3%. This value may depend on the structure of the greenhouse, the exact type of fixture, the orientation of the greenhouse with respect to the sun, the weather conditions (sunny or cloudy), the season of the year etc. The interception level may seem low but has a direct impact on production in the darker seasons of the year. The production is reduced with an amount similar to the daylight interception.

With that in mind it appears desirable to minimize this negative effect of the lighting installation. Also, other structures and installations in the greenhouse may be improved in order to minimize shading effects and reducing loss of the free sunlight. Structural frames could for instance be painted white, roof shapes may be optimized, size per window may be increased to lower the impact of the window frames, etc.

With the entrance of LED luminaires into the greenhouse, replacing HID fixtures, a relatively large penalty may be paid with respect to daylight interception. LED luminaires are much more efficient nowadays in terms of converting electricity into light, however they still appear to generate heat that is not emitted towards the crop as part of the radiation spectrum. LED luminaires may require a heatsink to remove heat via conduction and then release the heat to the air via (mainly) convention. Such heatsink may have a large contribution to the overall shape and size (volume) of the LED luminaire and therefore causes the largest part of the daylight interception.

It appears that LED luminaires may be bulkier than HID fixtures, while emitting the same or less amount of light. Active cooling of the heatsink may be applied, enabling reduction of relative heatsink size. In case of water cooling the fixture, the installation may become more complex, also the tubing required for cooling may take up space and blocks daylight. In case of using fans to force air through the heatsink, reliability of the system may become a question mark. The use of fans in an almost outdoor application appears not always to be recommended.

Hence, it is an aspect of the invention to provide an alternative (agricultural) light generating device, which preferably further at least partly obviates one or more of above-described drawbacks. The present invention may have as object to overcome or ameliorate at least one of the disadvantages of the prior art, or to provide a useful alternative, by providing a light generating device according to claim 1.

The housing may comprise a first end part and second end part, which may in embodiments be defined by the side wall elements. Especially, the (extremities of the) first end part and second end part have a mutual distance of H1. When the device is configured in an operational configuration, the first end part may be the bottom (part) and the second end part may be the top (part), the direction from top part to end part being essentially in the direction of gravity.

The housing comprises side wall elements. In embodiments, the side wall elements may comprise side wall. In yet other embodiments, the side wall elements may comprise panels (or "lamellae") in a roof tile configuration. Hence, in specific embodiments one or more of the side wall elements comprises a plurality of panels configured in a roof tile configuration. As further elucidated below, there is space between the panels (or panes of the roof-tile configuration, to allow air flow into and/or out of the housing. In this way, e.g. the light sources may be cooled. Hence, the panels configured in a roof tile configuration has the advantages of enabling air flowing through the side-wall elements into the housing (and/or out of the housing) for desired cooling and simultaneously of providing a better protection against water droplets entering into inner parts of the housing rendering the light generating device to be relatively safe. Typically, in green houses the atmosphere is relatively humid and droplets are formed by condensation on relatively cold walls and ceilings of the greenhouses. These droplets can fall on the housing of the light generating device and flow along the side wall elements downwards to the first end part, also referred to as bottom, of the light generating device. Yet, if these side wall elements are provided with openings, these droplets tend to fall into the inside of the housing, in particular if the side walls have an inclined orientation with respect to the direction of gravity, involving an enhanced risk of short circuiting and/or early failure of the light generating device. Additionally or alternatively, the second end part, also referred to as top, of the housing can have an overlapping, tiled configuration, such that in a projection parallel to the direction of gravity no direct line of view is possible from the bottom through the top op of the housing when it is empty (empty means without any of light source, thermally conductive element, electrical wiring, a driver, a control system, and a sensor being accommodated in the housing). By this feature it is counteracted that falling droplets can enter the housing via the top of the housing, while the top of the housing still has an opening to form an air flow channel from base to top of the housing. Thus, the risk on short circuiting and/or early failure of the light generating device is counteracted while air flow into and/or out of the housing for the desired cooling is still allowed. Hence, the light generating device has the feature that at least one of the second end and one or more of the side wall elements may comprise a plurality of panels configured in a roof tile configuration with openings between the panels, preferably said openings between the tiles are part of forming an air flow channel.

In a first aspect, the invention provides a light generating device ("lighting device" or "device") comprising (i) one or more light sources, especially a plurality of light sources, configured to generate light source light, and (ii) a housing comprising side wall elements. Especially, the housing has a virtual housing plane. In specific embodiments, the light sources comprise solid state light sources. In embodiments, the light sources are at least partially enclosed by the side wall elements. Further, especially the light generating device may be configured to generate at least 70%, such as at least 80%, more especially at least 90% of the light source light within a triangular prism having a top angle (α) smaller than 180°. In embodiments, the virtual housing plane is configured between the side wall elements. Especially, in specific embodiments the housing plane may be a plane of symmetry for the triangular prism. Further, especially the side wall elements each may have a first side directed inwards, such as directed to the light sources, and a second side directed outwards, such as directed away from the light sources. In embodiments, at least part of the second sides, even more especially essentially the entire second sides, is (are) reflective for visible light. Yet further, especially the side wall elements may be configured at both sides of the housing plane, each under a first angle (β1), in embodiments selected from the range of 0-45° relative to the housing plane. Especially the side wall elements may have a projection on the housing plane, with the projection having a first height (H1) and a first length (L1). Further, especially the side wall elements may define a largest width (W1) of the light housing (perpendicular to the housing plane), wherein the first height (H1) and the largest width (W1) have a ratio selected from the range of $H1/W1 \geq 0.25$, such as $H1/W1 \geq 0.5$, like especially $H1/W1 \geq 0.5$. Even more especially, $H1/W1 > 1$, such as $H1/W1 \geq 1.5$, or in embodiments even $H1/W1 \geq 2$. Hence, especially the invention provides in embodiments a light generating device comprising (i) a plurality of light sources configured to generate light source light, and (ii) a housing comprising side wall elements, wherein the housing has a virtual housing plane; wherein (a1) the light sources are at least partially enclosed by the side wall elements, (a2) the light generating device is configured to generate at least 90% of the light source light within a triangular prism having a top angle (α) smaller than 180° (wherein especially the virtual housing plane is configured between the side wall elements); wherein further the side wall elements: (b1) each have a first side directed inwards, such as directed to the light sources and a second side directed outwards, such as directed away from the light sources, wherein at least part of the second sides is reflective for visible light; (b2) are configured at both sides of the housing plane, each under a first angle ((β1) selected from the range of 0-45° relative to the housing plane; (b3) have a projection on the housing plane, with the projection having a first height (H1) and a first length (L1); and define a largest width (W1) of the light generating device, wherein the first height (H1) and the largest width (W1) have a ratio selected from the range of $H1/W1 \geq 0.25$, such as especially $H1/W1 \geq 1$, like in embodiments $H1/W1 \geq 1.5$. In embodiments, even $H1/W1 \geq 4$.

With such device, light interception of other light (by the light generating device, more especially the housing), such as daylight may be minimized. Further, with such device light loss of other light, such as day light, may be minimized, as reflection may lead to an effective (re)use of the reflected light. Further, with such device thermal management may be improved. Further, such device may be configured essentially "hidden behind" existing structures/frames in the greenhouse as much as possible; for instance, the device may in embodiments essentially fully be integrated into an existing frames (such as "trellis"). The wall elements may further be used to improve airflow and thermal dissipation of light source). The wall elements can be positioned to force air to move along an (actual) heatsink of light source. Further, the invention could also be possible to "integrate" around existing frames. In such embodiment, the wall elements could also cover up and hide parts of the frame. Yet further, the wall elements could also be used to reflect infrared radiation from the sun, e.g. preventing additional heat load to the heatsink of the light source.

Below, some features and embodiments are described in more detail.

In embodiments, a straight rim around the outside may be oriented vertically and painted white in order to redirect sunlight as much as possible towards the crop. Without the rim, the light may be absorbed in a fin structure, which may be basically a maze for light. Further, in embodiments the inside structure of the fins may allow for enough heat dissipation and thus cooling of the LEDs. As the top surface of the device may be considered to absorb essentially all the sunlight that is intercepted, reducing this absorbing top surface may be key to further reducing daylight interception.

As indicated above, the light generating device comprises one or more light sources, especially a plurality of light sources. The light source(s) are configured to generate light source light.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of (essentially identical (or different)) light sources, such as 2-2000 solid state light sources. In embodiments, the light source may comprise one or more micro-optical elements (array of micro lenses) downstream of a single solid state light source, such as a LED, or downstream of a plurality of solid state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

The phrases "different light sources" or "a plurality of different light sources", and similar phrases, may in embodiments refer to a plurality of solid state light sources selected from at least two different bins. Likewise, the phrases "identical light sources" or "a plurality of same light sources", and similar phrases, may in embodiments refer to a plurality of solid state light sources selected from the same bin.

Light emitting diodes (LEDs) can play a variety of roles in horticultural lighting such as: Supplemental lighting: Lighting that supplements the natural daylight in order to increase production (of tomatoes for example) or extend crop production during e.g. the autumn, winter, and spring period when crop prices may be higher; Photoperiodic lighting: The periodic duration of light is important for many plants. The durations and the relative ratio of light and dark periods in a, for example, 24 hour cycle influences the blossoming response of many plants. Manipulating the durations and/or their ratio by means of supplemental lighting may facilitate regulating the time of blossoming; Artificial lighting: Lighting for cultivation in horticulture systems independent of natural sunlight; Differentiation lighting: Lighting selected to facilitate cell differentiation, for example in the context of a tissue culture.

As indicated above, the light sources are configured to generate light source light. In specific embodiments, the light source light may be (or may comprise) horticulture light. The term "horticulture light" may herein especially refer to light having one more wavelengths in one or more of a first wavelength region of 400-475 nm and a second wavelength region of 625-675 nm. The relative energies (watt) that are provided in these regions may depend upon the type of plant and/or the growth phase. Hence, a recipe may define the ratio, optionally as function of time, for one or more types of plants. Especially, the term "horticulture light may refer to the PAR region (the photosynthetically active region from 400-700 nm). The term "horticulture light" may also be used for light that is applied to plants in hydroponic applications. As known in the art, in the PAR region (the photosynthetically active region from 400-700 nm) the reflection coefficient of leaves is relatively low (5-10%). Towards the near infrared, beyond 700 nm, the reflection coefficient increases. In specific embodiments, the horticulture light, may in addition to PAR light also include a small fraction (<20% of the power, especially about at maximum 10% of the power) far red, i.e. 700-800 nm.

As indicated above, the device may comprise a plurality of light sources. Especially, in embodiments the housing is elongated (see also below), and the device comprises a plurality of light sources configured in an array essentially parallel to an axis of elongation of the device and/or essentially parallel to the housing plane. Hence, the device may comprise a plurality of light sources, which may especially be configured in a 1D or 2D array. The light generating device may in embodiments comprise at least four light sources, such as at least 16 light sources, like in embodiments at least 32 light sources. Especially, in embodiments the light sources comprise solid state light sources, such as LEDs.

In specific embodiments, the light generating device may comprise a plurality of different light sources, such as two or more subsets of light sources, with each subset comprising one or more light sources configured to generate light source light having essentially the same spectral power distribution, but wherein light sources of different subsets are configured to generate light source light having different spectral distributions. In such embodiments, a control system may be configured to control the plurality of light sources. In specific embodiments, the control system may control the subsets of light sources individually.

The term "controlling" and similar terms especially refer at least to determining the behavior or supervising the running of an element. Hence, herein the term "controlling", and similar terms, may e.g. refer to imposing behavior to the element (determining the behavior or supervising the running of an element), etc., such as e.g. measuring, displaying, actuating, opening, shifting, changing temperature, etc., Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode.

Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

The control system may in embodiments be configured remote from the light generating device. In yet other embodiments, the control system may be comprised by the light generating device.

Further, the light generating device comprises a housing.

A relatively simple embodiment of the housing would be a beam shaped housing.

The bottom could be open for escape of light source light. Further, the top could also be open, which would allow an air flow through the housing for cooling the light source(s). The side wall elements would be parallel and could be reflective; likewise, the end walls could be. However, modification may also be possible, such as 1D or 2D curved side walls. The curvature may be such, that there are no end walls and/or there is no separate top (face). The side wall elements may be slanted and/or may be roof tiled. The side wall elements may define a rim of the housing. Whatever embodiments are chosen, it appears that one or more generic features may facilitate one or more of the above-indicated advantages. Such features are further elucidated below.

As further elucidated below, there is space between the panels (or panes of the roof-tile configuration, to allow air flow into and/or out of the housing. In this way, e.g. the light sources may be cooled. Hence, the panels configured in a roof tile configuration may allow air flowing through the side-wall elements into the housing (and/or out of the housing). Hence, in embodiments one or more of the side wall elements may comprise a plurality of panels configured in a roof tile configuration with openings between the panels. Optionally, the panels may be adjustable in angle relative to the housing plane. The light generating device may have the feature that the tiles are oriented at an angle $\beta 1$ with the direction of gravity, wherein $\beta 1$ is selected from the range of 0-45°, preferably $\beta 1$ is selected from the range of 15-40°. Said orientation enable a smooth and relatively save flow of droplets, i.e. a flow with relatively small risk on droplets entering the housing, flowing over the tiles from the top to the bottom. Hence, in embodiments cooling may be promoted in a number of ways. In embodiments, the side wall elements may be in thermal contact with the light sources. Then the walls may receive heat via conduction. Alternatively or additionally, walls may receive heat via radiation of the light sources. Walls heat up and will release heat to surrounding air via convection+radiation. Yet further, alternatively or additionally, the side wall elements may improve airflow around and/or through the housing by guiding the airflow.

In general, there are two side wall elements. Further, in specific embodiments, the two side wall elements may essentially be the same. The side wall elements may be a mirror image of each other (relative to a (virtual) plane), see also below).

The housing has a virtual housing plane ("housing plane"). In embodiments, during operation of the device, the virtual housing plane may be configured essentially vertical.

Herein, terms like "essentially vertical" or "vertical", and similar terms, may refer to configurations that are within about 5° of vertical.

Especially, in embodiments the light sources are at least partially enclosed by the side wall elements. More especially, in embodiments a light emitting surface of the light source may not be viewed directly from a view direction perpendicular to the housing plane. Hence, in specific embodiments the side wall elements may prevent a direct view of a light emitting surface by a viewer that is at the same height as the side wall elements when the housing plane is configured vertical and the viewer views (thus) in a horizontal direction.

As the light sources may at least partially enclosed by the side wall elements, it is herein also indicated that the first sides may be directed to the light sources and the second sides may be directed away of the light sources. Hence, especially the second sides may define a rim (or rim surface).

Yet further, in specific embodiments the light generating device may be configured to generate at least 70% of the light source light, especially at least 80%, such as even more especially at least 90%, within a triangular prism having a top angle (a) smaller than 180°. In embodiments, the housing plane may be a plane of symmetry for the triangular prism. As will be clear, this "triangular prism" is a virtual prism. However, as further described below in embodiments the side wall elements may also define the shape of a triangular prism or truncated triangular prism. The fact that in embodiments the light generating device may be configured to generate at least 90% of the light source light within a triangular prism having a top angle (a) smaller than 180°, may be due to one or more of (a) (downstream) optics, such as lenses, and (b) the side wall elements. Here, these percentage of the light source light especially refer to the total power (Watt) of the light source light). In specific embodiments, the light generating device may be configured to generate at least 70% of the light source light, within a triangular prism having a top angle (a) smaller than 140°, such as in more specific embodiments especially at least 80%, such as even more especially at least 90%. Especially, in embodiments the housing plane is a plane of symmetry for the triangular prism within which at least about 70% of the light source light is generated. In specific embodiments, the top angle (a) may be at least 30°, such as at least 45°.

The lenses may provide a specific beam shape, changing in embodiments an essential Lambertian beam into a more focused or collimated beam. The lenses may be comprised by an LED package, or may be configured further away from the light source, such as at a non-zero distance. The lenses may be provided by a micro lens array, but other embodiments may also be possible. Alternatively or additionally, the side wall elements may impose a beam shape and direct the light source light in a direction more collimated along the housing plane. Hence, in embodiments the side wall elements may also be reflective for the light source light (i.e. at least part of the first side (see below) may be reflective for the light source light, such as in embodiments specular reflective and/or in other embodiments diffuse reflective. The first side(s) may be specular reflective or diffuse reflective for the light source light. Especially, the first side(s) may have a relatively high reflectivity for the light source light. For instance, under perpendicular irradiation of the light source light at least 50%, such as at least 60%, especially at least 70% may be reflected by the first side(s). Even more especially, under perpendicular irradiation of the light source light at least 80%, such as at least 90%, especially at least 95% may be reflected by the first side(s). Hence, (also) at least part of the first sides is reflective for visible light.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Note that the term "triangular prism" is herein used in embodiments to refer to the light source light. This triangular prism may have the housing plane as plane of symmetry. Note that the housing plane is not necessarily a plane of symmetry for the housing. In embodiments, the housing may be essentially symmetric relative to the housing plane. However, in specific embodiments, the housing may also be asymmetric relative to the housing plane. In general, herein housings symmetric to the housing plane are described and schematically depicted.

In embodiments, the side wall elements each have a first side directed inwards, such as directed to the light sources and a second side directed outwards, such as directed away from the light sources. Hence, the side wall elements may define a cavity wherein at least part of each light source may be configured. Such cavity may further in embodiments host elements like one or more of electrical wiring, a driver, a control system, a sensor, etc. Hence, herein the phrase "wherein the light sources are at least partially enclosed by the side wall elements", and similar phrases, may especially indicate that one or more of the light sources, electrical wiring, a driver, a control system, and a sensor, even more especially at least one or more of the light sources, a driver, and a control system, are at least partially enclosed by the side wall elements. Yet even more especially at least part of the light sources and/or at least part of a driver are enclosed by the side wall elements. In general, the light sources may be configured such, that viewer viewing the housing in a suspended configuration from the same height as the housing may not see a light emitting surface of the light source (s).

Especially, in embodiments at least part of the second sides is reflective for visible light. In this way, in installed configuration, other light, such as solar light, may not be lost, e.g. due to trapping in heatsink fins, but may be reflected and (re)used. Especially, essentially the entire second sides may be reflective. The second side may be one or more of specular reflective and diffuse reflective. Especially the former appears to improve light management in an agricultural facility. Hence, in embodiments at least part of the second sides is specular reflective for visible light. For instance, in embodiments the second sides may be defined by white coated elements, by galvanized elements, or by mirror like elements, such as e.g. Alanod. In specific embodiments, at least part of each of the second sides, more especially essentially the entire second sides, may have a reflectivity for visible light of at least 50%, such especially at least 60%. Hence, in embodiments the at least part of the second sides have a reflectivity for visible light propagating in a direction perpendicular to the housing plane of at least 50%, such as at least 60%. Even more especially, the at least part of the second sides have a reflectivity for visible light propagating in a direction perpendicular to the housing plane of at least 70%, such as even more especially at least 80%. Especially, reflectively can be even larger, like even at least 90%, such as even at least 95%. Hence, the reflection may be high. Especially, the reflection is mirror like, as best results were obtained with mirror like embodiments, better than with an anodized layer, and in general also better than with a white coating. Hence, especially the reflection of the side wall elements may be obtained with a white material, even more especially with a mirror like material, having a reflection of at least 80%, even more especially at least 90%.

The terms "visible", "visible light" or "visible emission" and similar terms refer to light having one or more wavelengths in the range of about 380-780 nm.

In yet further specific embodiments, (the) at least part of each of the second sides may have a reflectivity for infrared radiation (propagating in a direction perpendicular to the housing plane, and especially having a wavelength selected from the range of 780-2500 nm, such as in specific embodiments at least in the range of 780-1100 nm, of at least 50%, such as at least 60%, or even more.

The above-indicated reflectivity may especially be a kind of macroscopic reflectivity. For instance, a highly reflective material with a plurality of cavities may still trap at least part of the light. Hence, in embodiments the above indicated reflectivities for the parts of the second sides may be a reflectivity integrated over the entire respective sides. Hence, e.g. a reflectivity for visible light propagating in a direction perpendicular to the housing plane of at least 50% of a second side would imply that would the second side evenly be irradiated with the visible light, 50% of all light will be reflected, as in average each part of the second side reflects at least 50%. Hence, the above-indicated reflectivities may also refer to an "effective reflectivity".

Further it appears that the side wall elements may be configured best parallel to the housing plane (assuming the (suspended) application of the device) or under a slight angle. Of course, the individual side wall elements may be configured differently, but will in general be configured under the same angle. Hence, in embodiments the side wall elements may be configured at both sides of the housing plane, each under a first angle (($\beta$1) selected from the range of 0-45° relative to the housing plane. Hence, in specific embodiments the side wall elements may be configured at both sides of the housing plane, each under a first angle (($\beta$1) of 0° relative to the housing plane, i.e. parallel to each other, whereas in other embodiments the side wall elements may be configured at both sides of the housing plane, each under a first angle (($\beta$1) selected from the range of 0<$\beta$1<45° relative to the housing plane. When both are configured under a non-zero angle, the side wall elements may define a triangular prism like shape. Hence, in specific embodiments the side wall elements may define a triangular prism shaped housing or a truncated triangular prism shaped housing. Especially, in embodiments the side wall elements may define a right triangular prism shaped housing or a truncated right triangular prism shaped housing.

The condition of the first angle (($\beta$1) selected from the range of 0-45° relative to the housing plane especially refers to the respective second side of the side wall elements. Especially, the condition of the first angle (($\beta$1) selected from the range of 0-45° relative to the housing plane may in embodiments refer to the entire second side of the respective side wall elements. In yet other embodiments, the condition of the first angle (($\beta$1) selected from the range of 0-45° relative to the housing plane may in embodiments refer to at least 80% of a surface area of the second side of the respective side wall elements. Note that the first side and the second side of the respective side wall element may not necessarily have the same angle relative to the housing plane. Hence, the condition of the first angle (($\beta$1) selected from the range of 0-45° relative to the housing plane especially refers at least to (at least 80% of the surface area of) the respective second side of the side wall element. It further appears that in view of interception of other light, especially natural light, the dimension of the housing are especially selected within specific ranges.

The side wall elements may have a projection on the housing plane, with the projection having a first height (H1) and a first length (L1). Further, the side wall elements define a largest width (W1) of the light housing. It appears especially beneficial the first height (H1) and the largest width (W1) have a ratio selected from the range of H1/W1≥0.25, such as H1/W1≥0.5. Yet better results may even be obtained with H1/W1≥1, such as H1/W1>1. Further, good (simulation) results were obtained when e.g. H1/W1≤16. Hence, in specific embodiments the first height (H1) and the largest width (W1) have a ratio selected from the range of 0.25≤H1/W1≤16, such as 1≤H1/W1≤16, even more especially 1<H1/W1≤16, such as in embodiments 1.5≤H1/W1≤8. In ye further specific embodiments, H1/W1≥2.

For instance, in embodiments the first height (H1) and the largest width (W1) have a ratio selected from the range of H1/W1≥0.25 and the first length (L1) may e.g. be selected from the range of at least 40 cm, such as selected from the range of e.g. 40-200 cm, like especially about 50-120 cm. For instance, assuming a 50 mm wide housing, the housing may have a height of at least 12.5 mm, even more especially at least 25 mm.

However, the housing may in embodiments not be higher than about 200 mm, such as not more than 100 mm. Especially, the housing may at least not be higher than about 500 mm.

In embodiments assuming H1/W1≥1.5 and assuming a 50 mm wide housing, the housing may e.g. have a height of at least 75 mm. The length may e.g. be selected from the range of 40-200 cm. However, embodiments with other lengths than 40-200 cm may also be possible. For instance, assuming in embodiments a 20 mm wide housing, the height may e.g. be 40 mm (assuming H1/W1≥2), and assuming a 200 mm length housing, W1/L1=0.1, and H1/L1=0.2.

In embodiments, the side wall elements may have a ratio selected from the range of 0.1≤H1/L1≤0.5, such as 0.15≤H1/L1≤0.4. However, other dimensions may also be possible. In embodiments, the largest width (W1) and the first length (L1) may have a ratio especially selected from the range of 0.1≤W1/L1≤0.5, such as 0.15≤W1/L1≤0.4.

However, other dimensions may also be possible. Hence, in embodiments H1/L1≥0.5 or H1/L1≥0.1. Alternatively or additionally, in embodiments W1/L1≥0.5 or W1/L1≤0.1.

Note that when the side wall elements are straight side wall elements, which are configured under a zero angle with the housing plane, the housing width (device width) defined by the side wall elements may be essentially constant over the entire. Hence, there may essentially be no difference between a minimum width and a maximum width.

Especially, in embodiments the side wall elements define a first housing opening, wherein during operation of the light generating device at least part of the light source light escapes via the first housing opening. In embodiments, there may be more than one first housing opening. In specific embodiments, there is a limited number of first housing openings, such as at most 8, like at most 4, such as at most 2, like 1. However, more than 8 housing openings may also be possible in embodiments.

Hence, especially the housing is not fully closed but includes one or more, especially a plurality of, openings. For instance, there may be openings between light sources and/or openings between light sources and side wall elements, and/or openings in the side wall elements. In this way, elements that increase in temperature may be cooled by a natural flow of air. Hence, in specific embodiments the light generating device may comprise an air flow channel configured to facilitate an air flow over at least part of the first height (H1). An air flow channel may especially be created by the absence of physical elements, such as, as indicated above, openings between light sources and/or openings between light sources and side wall elements, and/or openings in the side wall elements.

The term "air flow channel" may also refer to a plurality of (different) air flow channels.

Especially, the air flow channel(s) may be in thermal contact with the light sources and/or a thermally conductive element, such as a heat sink. For instance, an opening in the device may allow a flow of air from below to the device, through the device, to above the device. Hence, in specific embodiments the light generating device may comprise an air flow channel configured to facilitate an air flow over at least part of the first height (H1), with the air flow propagating through the housing.

As indicated above, the side wall elements may define the first housing opening. Yet further, the side wall elements may define a second opening. In specific embodiments, the first housing opening and second housing opening are configured at a mutual distance (d) of at least 0.5*H1. Especially, the first housing opening and the second opening are openings of the air flow channel. Hence, it may be desirable to have some length to allow a good air flow. The second housing opening is not necessarily at the top (which might lead to a mutual distance equal to about H1), but may also be in a side wall element. Further, the term "second housing opening" may also refer to a plurality of housing openings. Especially, the mutual distance is determined parallel to the housing plane.

As indicated above, the side wall elements may be planar and parallel. Alternatively, the side wall elements may be planar and configured under an acute angle (equal to or less than 90°). The side wall elements may in embodiments also be curved, such as 1D curved or 2D curved. A curvature may be along a length axis of the housing. This may lead to a cylindrical like shape. Alternatively or additionally, a curvature may be along a height axis of the housing. This may lead to a disc like shape. Note that only part of the side wall element(s) may be curved, such as an upper part. As indicated above, alternatively or alternatively, the side wall elements may also be multi-facetted (such as e.g. in a kind of roof-tile configuration).

When a side wall element is multi-facetted, this may be a closed side wall element or an open side wall element. In the former embodiment and/or the latter embodiment, e.g. in embodiments a lower straight part may have a first angle and an upper straight part may have another angle (relative to the housing plane). In the former embodiment (closed side wall element), the side wall element may have one or more bends. In the latter embodiment (open side wall element), a roof tile construction with openings in between may be possible. However, in principle also a roof-tile construction without openings might be possible. In view of thermal considerations, a roof-tile construction with openings between the tiles may be useful. Hence, the tiles or facets may form a stack with openings in the z-direction of the stack.

Hence, in specific embodiments the housing may comprise a first end part and a second end part, especially defined by the side wall elements, wherein at least part of both side wall elements converge to each other in the direction of the second end part. This converging may be with a planar side wall element (part) or with a curved side wall element (part). In specific embodiments, at least part of both side wall elements converge to each other in the direction of the second end part defining a semi-cylindrical like shape.

As indicated above, thermal management may be desirable. Part of the thermal energy may be dissipated with the side wall elements. Hence, in embodiments it may be useful when the side wall elements are thermally conductive. Hence, in specific embodiments the side wall elements may comprise a thermally conductive material having a thermal conduction of at least 10 W/m/K, even more especially 20 W/m/K.

A thermally conductive material may especially have a thermal conductivity of at least about 20 W/m/K, like at least about 30 W/m/K, such as at least about 100 W/m/K, like especially at least about 200 W/m/K. In yet further specific embodiments, a thermally conductive material may especially have a thermal conductivity of at least about 10 W/m/K.

In embodiments, the thermally conductive material may comprise of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide.

In embodiments, the thermally conductive material (of the side wall elements) may be in thermal contact with the light source(s) and/or with an optional heatsink (see also below).

An element may be considered in thermal contact with another element if it can exchange energy through the process of heat. In embodiments, thermal contact can be achieved by physical contact. In embodiments, thermal contact may be achieved via a thermally conductive material, such as a thermally conductive glue (or thermally conductive adhesive). Thermal contact may also be achieved between two elements when the two elements are arranged relative to each other at a distance of equal to or less than about 10 µm, though larger distances, such as up to 100 µm may be possible. The shorter the distance, the better the thermal contact. Especially, the distance is 10 µm or less, such as 5 µm or less. The distance may be the distanced between two respective surfaces of the respective elements. The distance may be an average distance. For instance, the two elements may be in physical contact at one or more, such as a plurality of positions, but at one or more, especially a plurality of other positions, the elements are not in physical contact. For instance, this may be the case when one or both elements have a rough surface. Hence, in embodiments in average the distance between the two elements may be 10 µm or less (though larger average distances may be possible, such as up to 100 µm). In embodiments, the two surfaces of the two elements may be kept at a distance with one or more distance holders.

Yet further, in embodiments the light generating device may further comprise a thermally conductive element at least partially enclosed by the side wall elements, wherein the light sources are configured in thermal contact with the thermally conductive element, and wherein in yet further embodiments the thermally conductive element comprises heat fins. In relation to "thermal contact" and thermally conductive", it is also referred to the above. Hence, especially the light generating device may further comprise a heatsink at least partially enclosed by the side wall elements.

Heatsinks are known in the art. The term "heatsink" (or heat sink) may especially be a passive heat exchanger that transfers the heat generated by device, such as an electronic device or a mechanical device, to a fluid (cooling) medium, often air or a liquid coolant. Thereby, the heat is (at least partially) dissipated away from the device. A heat sink is especially designed to maximize its surface area in contact with the fluid cooling medium surrounding it. Hence, especially a heatsink may comprise a plurality of fins. For instance, the heatsink may be a body with a plurality of fins extending thereof. A heatsink especially comprises (more especially consists of) a thermally conductive material. The term "heatsink" may also refer to a plurality of (different) heatsinks. Especially, the heatsink may essentially entirely be enclosed by the side wall elements (in view of reflectivity considerations). In addition to the heatsink, or alternative to the heatsink, the thermally conductive element may comprise a vapor chamber, a heat pipe, etc.

In agricultural applications, there may be support structures, such as e.g. trellis. It may be possible to suspend the light generating device from a part of the support structure. In this way, the light generating device may provide light to plants under the light generating device. Alternatively or additionally, the light generating device may consist of two or more parts, which may be assembled together around such part of the support structure, by which the light generating device may become part of the support structure and light interception may even further be reduced.

Hence, in embodiments the light generating device may be a modular device comprising a first part comprising one of the side wall elements and a second part comprising the other of the side wall elements, wherein, when assembled together, the light generating device comprises a suspension arrangement, wherein, when the light generating device is configured in a suspended state suspending from a predefined elongated support element (in embodiments having a second length (L2) larger than the first length (L1)), the light generating device encloses over the first length (L1) the predefined elongated support element.

Hence, in yet a further aspect the invention also provides a kit of parts comprising the first part and the second part, wherein first part comprising one of the side wall elements and a second part comprising the other of the side wall elements, wherein, when assembled together, the light generating device comprises a suspension arrangement, wherein, when the light generating device is configured in a suspended state suspending from a predefined elongated support element (in embodiments having a second length (L2) larger than the first length (L1)), the light generating device encloses over the first length (L1) the predefined elongated support element.

Hence, in a further aspect the invention further provides a method of installing the (modular) light generating device as defined herein, wherein the method comprises assembling the first part and the second part around the predefined elongated support element, wherein during operation of the light generating device the housing plane is perpendicular to a horizontal.

In yet a further aspect the invention also provides an agricultural facility (for growing plants), wherein the agricultural facility comprises a support structure and the light generating device as defined herein, wherein the light generating device is configured suspending from a part of the support structure. Especially, the support structure may be configured to support a roof and/or trays for plants. Especially, the support structure may be used to support a roof. The support structure may also be configured to support means for supply of water. The support structure may also be configured to support (conventional) lighting. The support structure may include vertical parts and horizontal parts. In embodiments, the support structure may include frames. Especially, horizontal parts (configured over a floor (and/or over a tray)) may be used as support for the light generating device.

As indicated above, the support structure may be a trellis or part thereof.

The agricultural facility may e.g. be a greenhouse. Especially, the agricultural facility is for growing plants wherein amongst others daylight is used, and in addition artificial light. The latter may be provided by the light generating device. Especially the agricultural facility may comprise a plurality of the light generating devices.

Herein, the term "plant" is used for essentially all stages of plant development. The term "plant part" may refer to root, stem, leaf, fruit (if any), flowers (if any) etc . . . .

The agricultural facility may especially be configured for hosting a plant. Especially, the agricultural facility may comprise a support to support the plant. Hence, in embodiments, during operation the plant may be arranged in an agricultural facility. Especially, the term "agricultural facility" may refer to structure for hosting the plant, especially wherein the plant is grown under (at least partially) controlled conditions.

The light generating device may especially be useful at places above the tropic of Cancer or below the Tropic of Capricorn, more especially at degrees of at least 35°, or even at least 40° north latitude or south latitude.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 1a-1b schematically depict some embodiments of the invention;

DETAILED DESCRIPTION OF THE EMBODIMENTS

Figure 2:
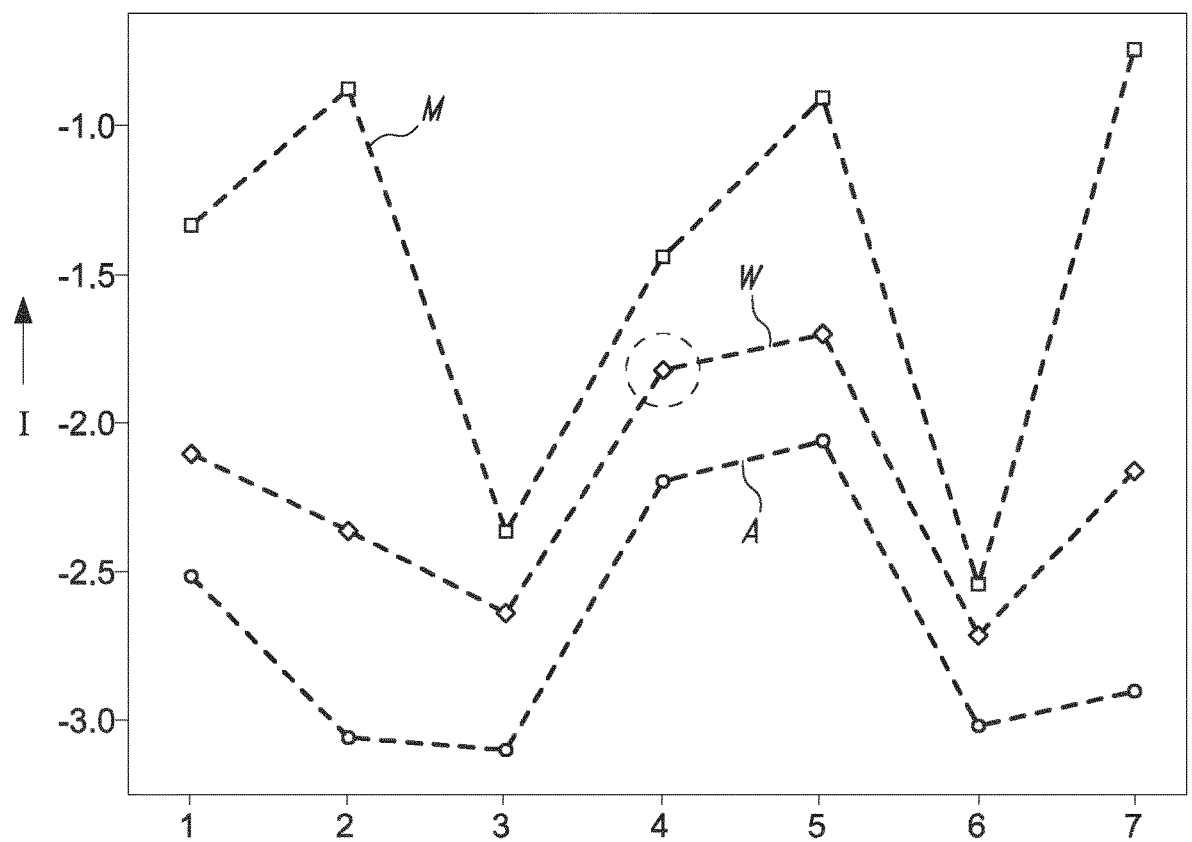
FIG. 2 schematically depicts some simulation results.

The herein described light generating devices may especially be passively cooled LED luminaires, though other embodiments are not excluded. It appears that a higher system efficacy may result in less heat generation per unit of light output. LED efficacy in the horticulture domain is still increasing. Hence, it may be that it is desirable that the amount of light per heatsink may e.g. double. Further, it appears useful when heat releasing surfaces, like e.g. fins of the heatsink, or the heatsink itself, should especially be arranged and oriented to allow air to flow through in a natural way. Also, in embodiments transportation of heat from the LED (PCB) towards the fins might be optimized allowing the heat to reach the fins efficiently. Further, it appears desirable that the intercepting (and light absorbing) outside surface of the luminaire should be reduced as much as possible. Herein, it is shown that this may be obtained by optimizing the shape. Yet further, it appears useful when the reflectivity of the remaining intercepting outside surface should be as high as possible, especially to allow re-use of intercepted daylight. Further, it appears useful when the luminaire could be "hidden behind" existing structures/frames in the greenhouse, as much as possible. In embodiments, it could essentially fully be integrated into existing frames.

In embodiments, a straight rim around the outside could oriented vertically and painted white in order to redirect sunlight as much as possible towards the crop. Without the rim the light would be absorbed in the fin structure, which is basically a maze for light. Further, in embodiments the inside structure of the fins may be designed to allow for enough heat dissipation and thus cooling of the LEDs. Yet further, as the top surface of the luminaire appears to absorb essentially all the sunlight that is intercepted, reducing this absorbing top surface may be useful to further reduce daylight interception.

FIGS. 1a-1b schematically depict some embodiments of the light generating device, indicated with reference 100.

FIG. 1a very schematically depicts an embodiment of the light generating device 100. The light generating device 100 comprises a housing 120 comprising side wall elements 20. The housing 120 has a virtual housing plane 110.

The side wall elements 20 have a projection on the housing plane 110, with the projection having a first height H1 and a first length L1. Further, the side wall elements 20 define a largest width W1 of the light generating device 100 (perpendicular to the housing plane 110).

As schematically depicted in more detail in FIG. 1b, the light generating device 100 comprises a plurality of light sources 10 configured to generate light source light 11 (see FIG. 1b, embodiments I-III). The light sources 10 are at least partially enclosed by the side wall elements 20. The light sources 10 may especially comprise solid state light sources, such as LEDs.

The light generating device 100 is configured to generate at least 70%, especially at least 80%, such as at least 90% of the light source light 11 within a triangular prism having a top angle α smaller than 180°, such as a top angle α equal to or smaller than 130°. The percentage especially relates to the total emitted power (in e.g. Watt) of the light source light 11. Especially, the housing plane 110 is a plane of symmetry for the triangular prism (within which the light source light 11 may be generated). As schematically depicted in the drawing, the virtual housing plane 110 is configured between the side wall elements 20. Or, in other words, the virtual housing plane 110 is configured between two faces of the triangular prism (wherein at least about 70% of the light source light may be generated). Further, the virtual housing plane intersects a third face of the triangular prism (wherein at least about 70% of the light source light may be generated).

As schematically depicted, the side wall elements 20 each have a first side 21 directed inwards, such as directed to the light sources 10 and a second side 22 directed outwards, such as directed away from the light sources 10. Especially, at least part of the second sides 22 is reflective for visible light. In specific embodiments, at least part of the second sides 22 is specular reflective for visible light.

In embodiments, the side wall elements 20 comprise a thermally conductive material having a thermal conduction of at least 20 W/m/K. This may facilitate thermal management of the device 100, as heat from the light sources may be better dissipated.

Further, the side wall elements 20 are configured at both sides of the housing plane 110, each under a first angle (β1 selected from the range of 0-45° relative to the housing plane 110. First angles β1 for the respective side wall elements 20 may be the same, but may in specific embodiments also differ. In FIG. 1a, and in embodiment I of FIG. 1b, the first angle β1 is 0°.

Referring to embodiments II and III in FIG. 1b, the condition of the first angle (β1) selected from the range of 0-45° relative to the housing plane especially refers to the respective second side 22 of the side wall elements 20. Especially, the condition of the first angle ((β1) selected from the range of 0-45° relative to the housing plane may in embodiments refer to the entire second side 22 of the respective side wall elements 20 (see especially embodiment II). In yet other embodiments, the condition of the first angle ((β1) selected from the range of 0-45° relative to the housing plane may in embodiments refer to at least 80% of a surface area of the second side 22 of the respective side wall elements 20 (see also embodiment III).

Reference AF indicates an air flow. Hence, especially the housing 20 is configured such that an air flow may flow through at least part of the housing 20, especially over at least part of the first height H1.

As indicated above, the side wall elements 20 may have a projection on the housing plane 110, with the projection having a first height H1 and a first length L1. Further, the side wall elements 20 may define a largest width W1 of the light generating device 100 or of the housing (perpendicular to the housing plane 110). Amongst others from the simulation, it appears that especially H1/W1≥0.25, such as H1/W1≥0.5, may be beneficial. Further, good (simulation) results were obtained when e.g. H1/W1>1. Hence, in specific embodiments the first height (H1) and the largest width (W1) have a ratio selected from the range of H1/W1>1, even more especially H1/W1≥1.5, such as in embodiments H1/W1≥2. The simulations show that amongst others increasing H/W shows better results, when also increasing the reflectivity of the side walls. A theoretical luminaire that has large H but minimal W and 100% reflectivity would show the best results, as the maximum amount of sunlight will be reflected. In a specific example of relatively narrowest luminaire of 200 mm high and 20 mm wide, H1/W1=10. However, the housing may in embodiments not be higher than about 200 mm.

Further, in specific embodiments 0.1≤W1/L1≤0.5. Especially, 0.15≤H1/L1≤0.4 and 0.15≤W1/L1≤0.4.

As schematically depicted in embodiments I-III in FIG. 1b, the light generating device 100 may comprise an air flow channel 30 configured to facilitate an air flow over at least part of the first height H1.

Especially, the side wall elements 20 define a first housing opening 25. During operation of the light generating device 100 at least part of the light source light 11 escapes via the first housing opening 25.

Further, the side wall elements 20 may define the first housing opening 25 and a second opening 26 at a mutual distance d of at least 0.5*H1. Especially, the first housing opening 25 and the second opening 26 are openings of the air flow channel 30. In embodiments I-III of FIG. 1b, the distance d is essentially H1. As indicated above, the first height H1 is especially defined parallel to the housing plane 110.

The housing 120 may comprises a first end part 125, which may also be indicated as bottom, and a second end part 126, which may also be indicated as top, defined by the side wall elements 20.

In embodiments, see embodiments II and III in FIG. 1b, at least part of both side wall elements 20 converge to each other in the direction of the second end part 126. For instance, see embodiment II of FIG. 1b, the side wall elements 20 define a (truncated) triangular prism shaped housing 120. In another example, see embodiment III of FIG. 1b, at least part of both side wall elements 20 converge to each other in the direction of the second end part 126, e.g. defining a semi-cylindrical like shape.

Referring to embodiment II of FIG. 1b, the schematically depicted housing especially has the shape of a truncated right triangular prism. Three faces are shown (not taking the top face due to the truncation), of which two faces are defined by the side wall elements. The virtual housing plane 110 is configured between these two faces, and is in this embodiment also a plane of symmetry for those faces. Likewise, the virtual housing plane 110 is in this embodiment a plane of symmetry for the side wall elements 20. Note that in this embodiments 2*β1 is not the same as a. These angles are not necessarily the same. Angle α may be used for indicated the intensity distribution of the light source light 11 and angles (31 are used to indicate the angle of the side wall elements 20 with the virtual housing plane 110.

Simulations were performed to determine the effect of form factor and surface finish on daylight interception. In total 7 different form factors have been included, ranging from 'flat and wide' to 'high and narrow'. The 7 examples are indicated below. Note that in all these examples, it was assumed that the housing has a beam like shape (i.e. all angles of all faces 90°):

| Design | Length (L1) (cm) | Width (W1) (cm) | Height (H1) (cm) | H1/W1 | H1/L1 | W1/L1 |
| --- | --- | --- | --- | --- | --- | --- |
| 1 | 125 | 12 | 12 | 1 | 0.096 | 0.096 |
| 2 | 125 | 6 | 24 | 4 | 0.192 | 0.048 |
| 3 | 125 | 24 | 6 | 0.25 | 0.048 | 0.192 |
| 4 | 62.5 | 24 | 12 | 0.5 | 0.192 | 0.384 |
| 5 | 62.5 | 12 | 24 | 2 | 0.384 | 0.192 |
| 6 | 62.5 | 48 | 6 | 0.125 | 0.096 | 0.768 |
| 7 | 62.5 | 6 | 48 | 8 | 0.768 | 0.096 |

For each of those shapes the finish or reflection of the outside vertical walls was varied: anodized (40%), mirror (95%) and white (87%). These are indicated in FIG. 2 with references A, M, and W, respectively. All situations have the same artificial light level installed. All models have the same cubic volume. In FIG. 2, the numbers on the x-axis refer to the designs; the y-axis indicates the reduction relative to the daylight level. In the simulation, realistic dimensions in relation to the greenhouse and conditions in relation to sunlight have been chosen. The geographic location is over the tropic of Cancer, especially the Netherlands.

A few conclusions can be drawn from this FIG. 2:
1. flat and wide form factors (model 3,6) are blocking the most daylight;
2. For anodized and white finishes, it seems best to keep all 3 dimensions as similar as possible; for example, using a square cross-section, or even a cube overall shape;
3. With a highly reflective 'mirror' finish it is possible to reduce daylight interception drastically, in combination with 'high and narrow' shape (models 2,5,7).

Figure 3A:
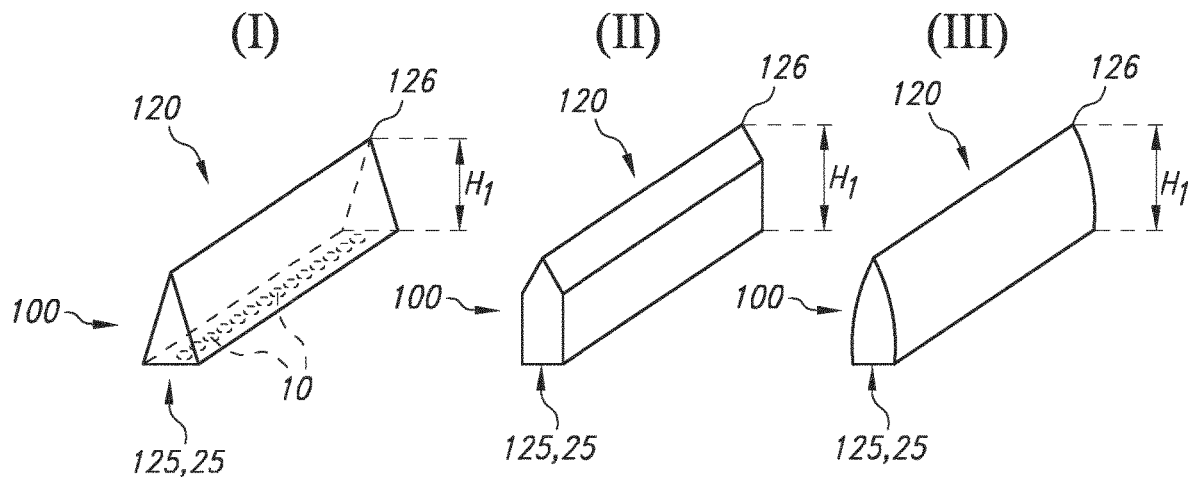
FIGS. 3a-3c schematically depict some further embodiments with some aspects of the invention.
Figure 3B:
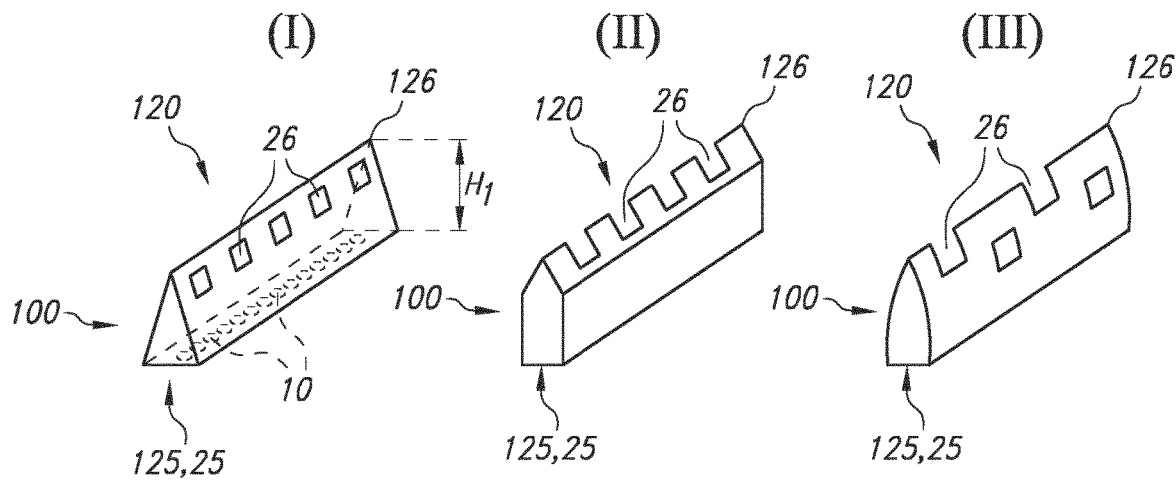

FIG. 3a schematically depict some further examples, similar to those schematically depicted in embodiments II and III in FIG. 1*b*. The embodiments in FIGS. 3*a*-3*b* are indicated with numbers I, II, and III. There is no specific relation with the number I-III in FIG. 1*b*.

FIG. 3*b* schematically depict some embodiments of openings 26. Different options may be possible.

FIGS. 3*a*-3*b* schematically show examples of linear grow light luminaires comprising a device top with a minimal horizontal surface (essentially only a line). A possible issue with conventionally shaped luminaires may be that incident light reaching the horizontal top surface of the luminaire will be reflected upwards away from the plants. FIGS. 3*a*-3*b* shows examples of the specific embodiment whereby the linear greenhouse luminaire is shaped in such a way that its device top has a minimum horizontal surface. Typically, the cross-section of such a device will be (substantially) triangular shaped or drop shaped. Referring to FIG. 1*b* (especially embodiment II) and FIGS. 3*a* and 3*b* (especially embodiments I), the housing may in embodiments be a triangular prism shaped housing or truncated triangular prism shaped housing.

Referring to embodiment I of FIGS. 3*a* and 3*b*, the schematically depicted housing especially has the shape of a right triangular prism. Three faces are shown, of which two faces are defined by the side wall elements. The virtual housing plane (not depicted) is configured between these two faces, and is in this embodiment also a plane of symmetry for those faces. Likewise, the virtual housing plane is in this embodiment a plane of symmetry for the side wall elements.

As indicated above, it is herein described to optimizing the shape or form factor of the lighting system or luminaire or light generating device. Amongst others, a (linear) luminaire is proposed to provide grow light for a greenhouse whereby (1) the top of the linear luminaire has a minimal horizontal surface (e.g. being a line) and (2) highly reflective surfaces are used on the outside walls to re-use (redirect) incident daylight as much as possible. It is also possible to combine such multiple linear structures, e.g. in an open 2D grid above the plants, or by integrating the proposed solution with the mechanical support structure (trellis) of the greenhouse.

Figure 3C:
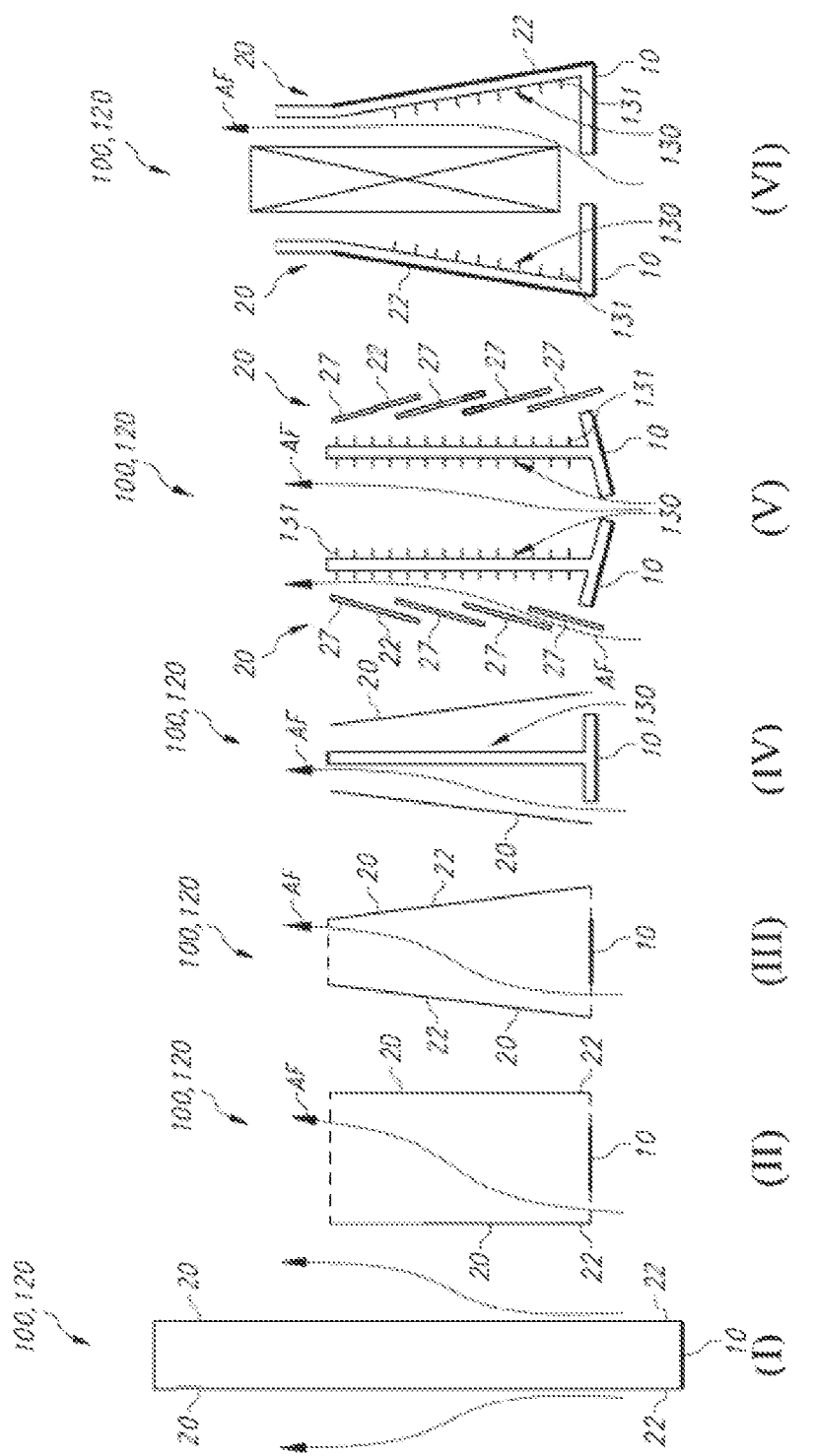

There are multiple embodiments possible to reduce the daylight interception. Cross-sections are shown schematically in FIG. 3*c* and discussed below. Especially, the side wall elements 20 are highly reflective, such as mirror-like, with a reflection of at least 90%. Dashed elements may be absorbing light. Perforated elements allow air to flow through. References 10 indicate light sources. The arrows AF indicate airflow. FIG. 3*c* schematically depicts some options to reduce daylight interception.

Embodiment I has a form factor where the width is minimal, but height is large to still have sufficient cooling surface area. The large sidewalls are highly reflective, either specular like a mirror or diffusing like paper (or a hybrid of the two). The large sidewall can have a significant contribution to heat dissipation via radiation (on top of convection) if a material like 'Alanod MIRO' is used. This material combines high light reflectivity with high thermal emissivity. Transporting heat from the led towards the top is challenging due to large distance. This can be solved by using a thick-walled aluminum structure; however, this would increase weight. Alternatives are using heat-pipes, vapor chamber or a thermosyphon principle to transport the heat upwards inside the luminaire.

Embodiment II has a form factor and functionality very similar to the existing Signify Compact module, but with 'half the width and double the height'. Transporting heat is easier compared to a). In embodiments I and II of FIG. 1, the first angle is essentially 0°.

Embodiment III provides a variation to II in which the top surface is reduced and the vertical sidewalls tilted. Hence, the first angle is unequal to 0°.

Embodiment IV has reflective sidewalls, which are thermally decoupled and can be considered as a 'jacket'. It still allows airflow along the actual (hidden) heatsinks. Hence, in embodiments the light generating device 100 may further comprise a thermally conductive element 130 at least partially enclosed by the side wall elements 20, wherein the light sources 10 are configured in thermal contact with the thermally conductive element 130, and wherein the thermally conductive element comprises heat fins 131. See further also FIGS. 4*a*-4*b*.

Embodiment V is essentially the same as embodiment IV but with an external reflector consisting of multiple lamellae to allow airflow to enter at multiple intake positions, such as via openings in between the lamellae. The lamellae overlap slightly, for example in that they are arranged in a roof tile configuration, to ensure maximal interception and redirection of sunlight. Another variation is to have an adjustable tilt of the light emitting areas slightly to enable a wider beam or better aiming of the beam of light resulting in a better uniformity at crop level. Hence, in embodiments one or more of the side wall elements comprises a plurality of panels configured in a roof tile configuration. Here, the tiles or facets or panels may form a stack with openings in the z-direction of the stack. This allows entrance of the air via the side wall elements.

Embodiment VI is an embodiment where the lighting system can be mounted 'around' the trellis mounting structure in a greenhouse. The net interception is lower since the trellis structure would already cause daylight interception. Basically, the lighting system is mounted in (part of) the shadow of the mounting structure. The lighting system could consist of 2 sub-modules allowing upward airflow through the center. The 2 sub-modules are mechanically connected to 1 system, or individually mounted to the trellis. The concept can also be combined with V). The rectangular feature in the middle of the light generating device symbolized part of a support structure (such as e.g. the trellis).

Especially, in general the light sources 10 may be configured such, that viewer viewing the housing in a suspended configuration (as schematically depicted in FIG. 3*c*) from the same height as the housing may not see a light emitting surface of the light source(s). In embodiments, referring to embodiments V of FIG. 3*c*, the lowest panel may be as low as the lowest light emitting surface of the light source(s) (assuming the light generating device 100 configured in an operational configuration).

Of course it may also be possible to mount concept a) or any other luminaire to both sides of the trellis. However, the new concept is about having the functionality available in a single luminaire.

Figure 3D:
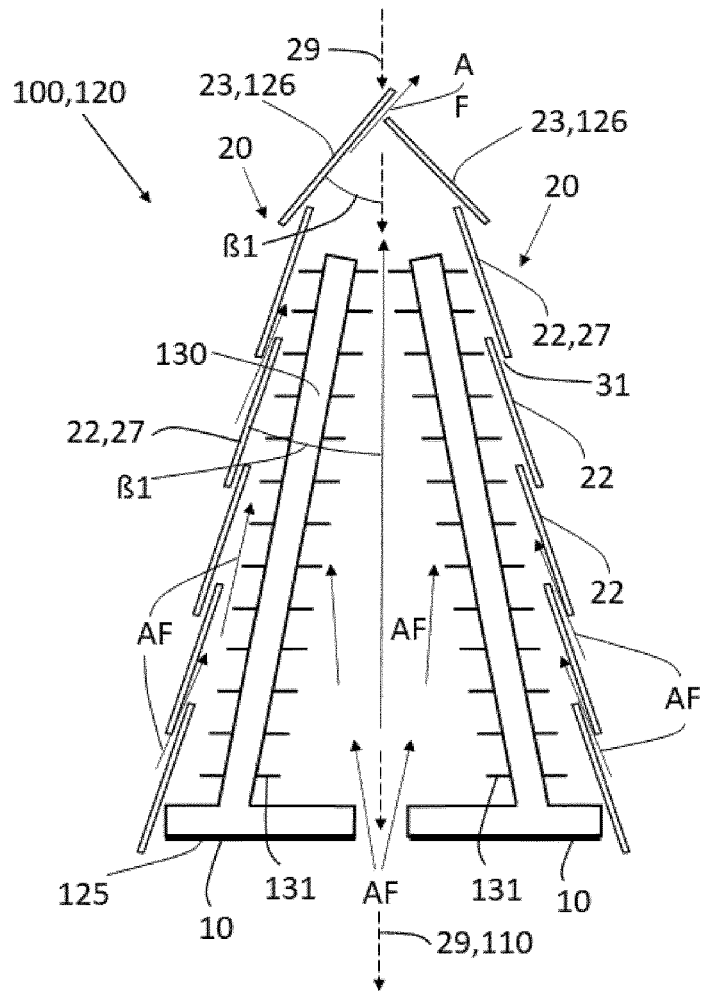
FIG. 3d schematically depicts a still further embodiment.

FIG. 3*d* schematically depicts and embodiment of the light generating device 100, similar to embodiments V of FIG. 3*c*, with an option to counteract droplets that fall in the direction of gravity 29, to enter the housing 120. The housing 120 comprises a first end part 125, a second end part 126 and side walls 20 extending between the first end part and the second end part. Each side wall 20 comprises a plurality of panels 27 arranged in a roof tile configuration, with openings 31 between the panels, also referred to as tiles, enabling air flow AF between the panels along heat fins 131 of thermally conductive elements 130. Light sources 10 are arranged at the first end 125 while top roof panels 23 are arranged at the second end 126. The panels 27 are oriented at an angle 131 of about 15° with the direction of gravity 29 and housing plane 110, while the top panels 23 are oriented at a respective angle 131 of about 40° with the direction of gravity 29 and the housing plane 110. Both the panels 27 and the top panel 23 overlap in a manner such that water droplets can flow over the panels 27 and the top panels 23 in the direction of gravity 29, essentially without entering the housing 120. It is particularly noted that the top panels 23 are arranged on either side of the housing plane 110, yet overlap each other such that in a projection parallel to the direction of gravity 29 no direct line of view is possible from the bottom 125 through the top 126 of the housing 120 when the housing is empty.

Figure 4C:
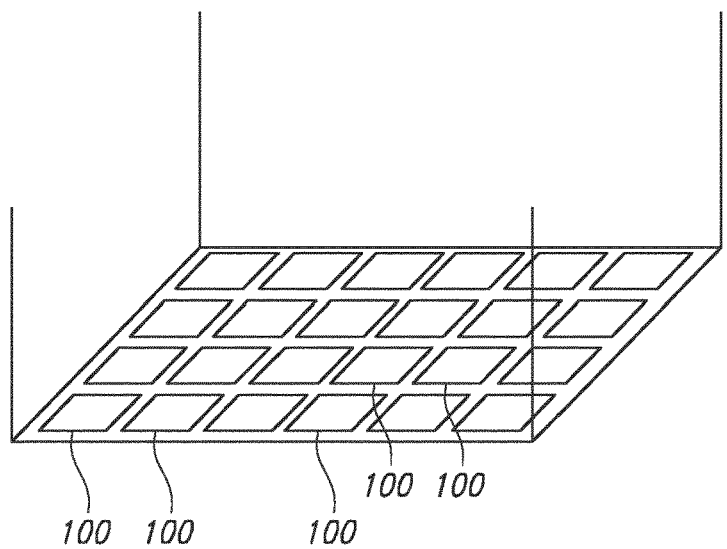
FIGS. 4a-4c schematically depict some further aspects and embodiments. The schematic drawings are not necessarily to scale.
Figure 4A:
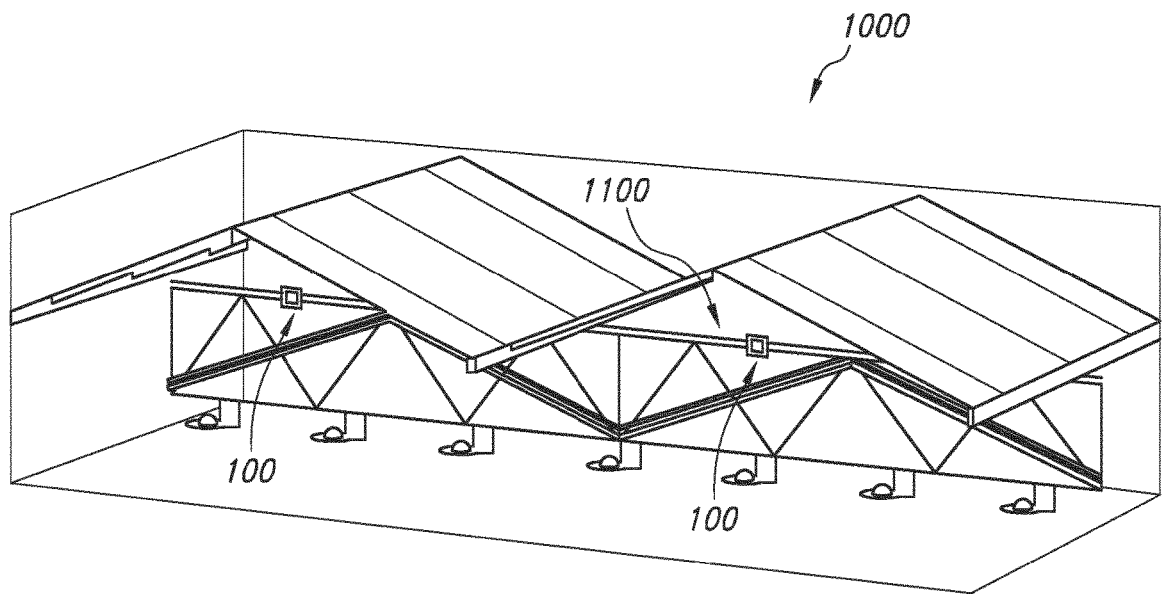

FIG. 4a schematically depicts an embodiment of an agricultural facility 1000, such as a greenhouse roof-construction. Reference 1100 indicates support structure. By way of example, two light generating devices 100 are depicted, which by way of example may enclose part of the support structure 1100. Hence, FIG. 4a schematically depict an embodiment of the agricultural facility 1000 (for growing plants (not shown)), wherein the agricultural facility 1000 comprises a support structure 1100 and the light generating device 100, wherein the light generating device 100 is configured suspending from a part of the support structure 1100.

Figure 4B:
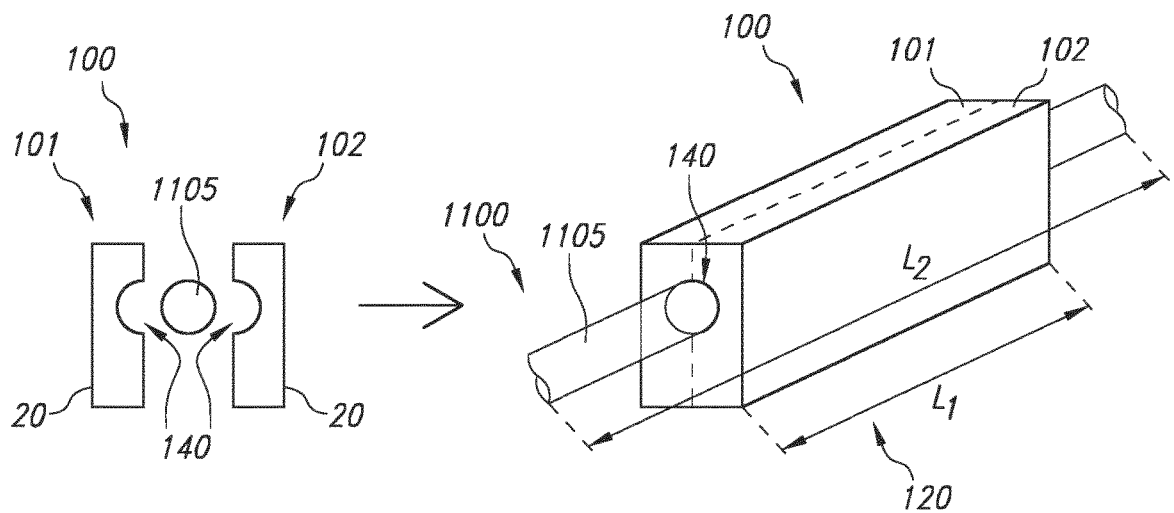

Referring to FIG. 4b, the light generating device 100 may be a modular device comprising a first part 101 comprising one of the side wall elements 20 and a second part 102 comprising the other of the side wall elements 20. When assembled together, the light generating device 100 comprises a suspension arrangement 140, wherein, when the light generating device 100 is configured in a suspended state suspending from a predefined elongated support element 1105 (having in embodiments a second length L2 larger than the first length L1), the light generating device 100 encloses over the first length L1 the predefined elongated support element 1105.

FIG. 4b schematically also depicts an embodiment of a method of installing a light generating device 100, wherein the method comprises assembling the first part 101 (of a kit of parts) and the second part 102 (of a kit of parts) around the predefined elongated support element 1105, wherein during operation of the light generating device 100 the housing plane 110 is perpendicular to a horizontal. FIG. 4b (thus) also schematically depicts a kit of parts which may be used to assemble into the light generating device 100. The kit of parts may also include more elements (than the first part and the second part).

Multiple elements of the proposed linear lighting element concept may also be combined in new form factors, such as depicted in FIG. 4c. For instance, an open 2D grid structure could be created by combining multiple linear light generating devices 100, possibly hanging on multiple wires as a pendant structure which may be vertically moved to adjust for the plant height.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating device comprising (i) a plurality of light sources configured to generate light source light, and (ii) a housing comprising side wall elements, a first end part and a second end part, wherein the housing has a virtual housing plane configured between the side wall elements:
wherein the light sources comprise solid state light sources, wherein the light sources are at least partially enclosed by the side wall elements; wherein the light generating device is configured to generate at least 90% of the light source light within a triangular prism having a top angle (α) smaller than 180°;
wherein the side wall elements:
each have a first side directed inwards, and a second side directed outwards, wherein at least part of the second sides has a predetermined reflectiveness for visible light;
are configured at both sides of the housing plane, each under a first angle selected from the range of 0-45° relative to the housing plane;
have a projection on the housing plane, with the projection having a first height; and wherein the side wall elements define a largest width of the light housing, wherein the first height and the largest width have a ratio selected from the range of H1/W1>=2,
wherein the predetermined reflectiveness of the at least part of the second sides and the ratio of H1/W1>=2, are selected to reduce daylight interception;
wherein at least one of the second end part and one or more of the side wall elements comprises a plurality of panels which overlap such that:
no direct line of view is possible from a bottom through a top of the housing;
falling droplets cannot enter the housing via the top of the housing and are enabled to flow over the panels from the top to the bottom without entering the housing; and
the side wall has openings between the panels enabling an air flow (AF) between said panels.

2. The light generating device according to claim 1, wherein the openings between the panels are part of an air flow channel configured to facilitate the air flow (AF) over at least part of the first height.

3. The light generating device according to claim 1, wherein the side wall elements define a first housing opening, wherein during operation of the light generating device at least part of the light source light escapes via the first housing opening.

4. The light generating device according to claim 2, wherein the side wall elements define the first housing opening and a second opening at a mutual distance (d) of at least 0.5*H1, wherein the first housing opening and the second opening are openings of the air flow channel.

5. The light generating device according to claim 1, wherein the first end part and the second end part are defined by the side wall elements, wherein at least part of both side wall elements converge to each other in the direction of the second end part.

6. The light generating device according to claim 1, where the side wall elements define a right triangular prism shaped or truncated right triangular prism shaped housing.

7. The light generating device according to claim 1, wherein at least part of both side wall elements converge to each other in the direction of the second end part defining a semi-cylindrical like shape.

8. The light generating device according to claim 1, wherein at least part of the second sides is specular reflective for visible light, and wherein the at least part of the second sides have a reflectivity for visible light propagating in a direction perpendicular to the housing plane of at least 60%.

9. The light generating device according to claim 1, wherein the side wall elements comprise a thermally conductive material having a thermal conduction of at least 20 Wm/K.

10. The light generating device according to claim 1, wherein the tiles are oriented at an angle β1 with the direction of gravity, wherein β1 is selected from the range of 0-45°, preferably β1 is selected from the range of 15-40°.

11. The light generating device according to claim 1, wherein H1/W1>=4.

12. The light generating device according to claim 1, further comprising a thermally conductive element at least partially enclosed by the side wall elements, wherein the light sources are configured in thermal contact with the thermally conductive element, and wherein the thermally conductive element comprises heat fins.

13. The light generating device according to claim 1, wherein the light generating device is a modular device comprising a first part comprising one of the side wall elements and a second part comprising the other of the side wall elements, wherein, when assembled together, the light generating device comprises a suspension arrangement, wherein, when the light generating device is configured in a suspended state suspending from a predefined elongated support element, the light generating device encloses over the first length the predefined elongated support element.

14. An agricultural facility, wherein the agricultural facility comprises a support structure and the light generating device according to claim 1, wherein the light generating device is configured suspending from a part of the support structure.

15. A method of installing a light generating device according to claim 13, wherein the method comprises assembling the first part and the second part around the predefined elongated support element, wherein during operation of the light generating device the housing plane is perpendicular to a horizontal.

* * * * *